United States Patent [19]
Fetters

[11] Patent Number: 5,163,815
[45] Date of Patent: Nov. 17, 1992

[54] ROTOR BLADE CONTROL MECHANISM

[76] Inventor: Dennis L. Fetters, 8109 N. Hickory #235, Kansas City, Mo. 64118

[21] Appl. No.: 737,193

[22] Filed: Jul. 29, 1991

[51] Int. Cl.⁵ .............................................. B63H 1/06
[52] U.S. Cl. ................................ 416/164; 416/168 R; 416/114
[58] Field of Search ................... 416/163, 164, 168 R, 416/147, 108, 98, 114

[56] References Cited

U.S. PATENT DOCUMENTS

| | | | |
|---|---|---|---|
| 2,499,314 | 2/1950 | Hunt. | |
| 2,511,687 | 6/1950 | Andrews. | |
| 2,810,443 | 10/1957 | Doman | 416/114 |
| 2,946,390 | 7/1960 | Pozgay. | |
| 3,109,496 | 11/1963 | Ellis, III et al. | 416/98 |
| 3,577,616 | 3/1971 | Ulisnik | 416/98 |
| 3,637,321 | 1/1972 | Nekrasov et al. | |
| 3,756,743 | 9/1973 | Robertson | 416/108 |
| 3,885,887 | 5/1975 | Desjardins. | |
| 4,432,696 | 2/1984 | Stephan et al. | |
| 4,534,704 | 8/1985 | McArdle | 416/98 |
| 4,681,511 | 7/1987 | Glatfelter. | |

FOREIGN PATENT DOCUMENTS

| | | | |
|---|---|---|---|
| 888158 | 12/1943 | France | 416/114 |
| 171641 | 8/1965 | Sweden | 416/98 |

Primary Examiner—Thomas E. Denion
Attorney, Agent, or Firm—Wm. Bruce Day

[57] ABSTRACT

A rotor blade control mechanism includes a transmission driving a hollow rotating drive shaft, extending through the transmission. A rotor head is attached to a top end of the drive shaft and includes rotor blade shafts of variable pitch and having control arm and lengths for cyclic and collective variation of the rotor blade shafts. A control regulates the rotor head control and lengths and includes at least a pair of rods extending through the hollow drive shaft with upper ends operably connected to the rotor head control arm and links and lower ends terminating substantially at a drive shaft bottom end. The control includes a fork with spaced fingers at the drive shaft bottom end and a yoke with spaced arms positioned in opposed relation to the fork. The yoke has a mounting block extending between the arms with the control rod lower ends swingably connected to the mounting block. A swing pin extends perpendicular to the yoke, through the mounting block, and is retained in the fork by the spaced fingers. The control extends from the drive shaft at the bottom end and swings perpendicular to the rotation of the drive shaft, imparting a mutually variable push-pull effect to the control rods for cyclic variation. Guide channels in the spaced fingers and slide blocks mounted in the guide channels to which the swing pin is connected for up and down sliding movement of the yoke impart a unitary push-pull effect to the control rods for collective variation of the rotor blade shafts.

1 Claim, 2 Drawing Sheets

ROTOR BLADE CONTROL MECHANISM

FIELD OF THE INVENTION

The present invention relates to a helicopter rotor blade control mechanism and in particular to a rotor blade control mechanism of simplified construction and reduced mass.

BACKGROUND OF THE INVENTION

A rotor blade control mechanism for a helicopter normally employs a device called a swashplate which transfers command movements to produce variations in the cyclic or collective movement to the blades. This revolving mass, normally of considerable size, produces a gyroscopic effect when trying to change directions in the helicopter. A typical swashplate includes revolving and fixed portions, with the latter sliding up and down a mast when collective command is added to a cyclic command, lifting or lowering the swashplate. The swashplate is normally exterior and concentric to the mast and transfers power of rotation to the rotor blades and uses bearings of large diameter. The large bearing mast and revolving spherical body increase the friction and gyroscopic effect.

The swashplate mechanism has made it impractical heretofore to build helicopters of small, lightweight material and at low expense for the recreational pilot. While the recreational pilot may fairly inexpensively buy a conventional fixed wing aircraft, either of manufactured or homebuilt design, this has not generally been possible with helicopters.

The instant invention which avoids the use of a swashplate and substitutes a command and control means of novel configuration provides a significant advantage to the recreational pilot or to lightweight, low maintenance helicopters.

SUMMARY OF THE INVENTION

The present invention approaches the problem of the bulky and expensive helicopter swashplate mechanism by providing a novel control mechanism, including a transmission with a rotating hollow drive shaft and a rotor head attached to the upper end of the hollow drive shaft. The rotor head includes rotor blade shafts of variable pitch with control arms and lengths for cyclic and collective variation of the rotor blade shafts. The control regulates the rotor head control arm and lengths and includes at least a pair of rods extending through the hollow drive shafts with rod upper ends operably connected to the rotor head control arms and lengths, and lower ends terminating substantially at the drive shaft bottom end. The control includes a fork with spaced fingers at the drive shaft bottom end and a yoke having spaced arms positioned in opposed relation to the fork. The yoke has a mounting block extending between the arms, with the control rod lower ends swingably connected to the mounting block and a swing pin extending perpendicular to the yoke, through the mounting block and retained in the fork spaced fingers by a connector. The control spins with the drive shaft at the bottom end and swings perpendicular to the axis of rotation of the drive shaft imparting a mutually variable push-pull effect to the control rods for cyclic variation of the rotor blade shafts. The yoke and fork connector includes guide channels in the spaced fingers and slide blocks mounted in the guide channels to which the swing pin is connected for up and down sliding movement of the yoke, imparting a unitary push-pull effect to the control rods for collective variation of the rotor blade shafts. Finally, a coordinator, including a central body is spinnably connected to the yoke by a pin and bearing arrangement coaxially positioned with respect to the drive shaft and having coordinator arms extending outwardly thereof for eventual connection to the pilot's collective and cyclic control sticks. The coordinator is swingable sidewardly with the yoke and movable up and down with the yoke for cyclic and collective variation.

OBJECTS OF THE INVENTION

The objects of the present invention are: to provide a novel rotor blade control mechanism which avoids the use of a conventional swashplate mechanism; to provide such a rotor blade control mechanism which is compact and reduces the weight and bulk of the helicopter; to provide such a rotor blade control mechanism in which collective and cyclic control rods are positioned in protective relation on the inside of a rotating, hollow drive shaft; to provide such a rotor blade control mechanism with a minimum of exposed arms, linkages and bearings which could injure a mechanic or pilot or which would produce excessive noise; to provide such a rotor blade control mechanism which is simple in construction, provides a minimum of parts and is well adapted for the intended purpose.

Other objects and advantages of this invention will become apparent from the following description.

DETAILED DESCRIPTION OF THE INVENTION

Figure 1:
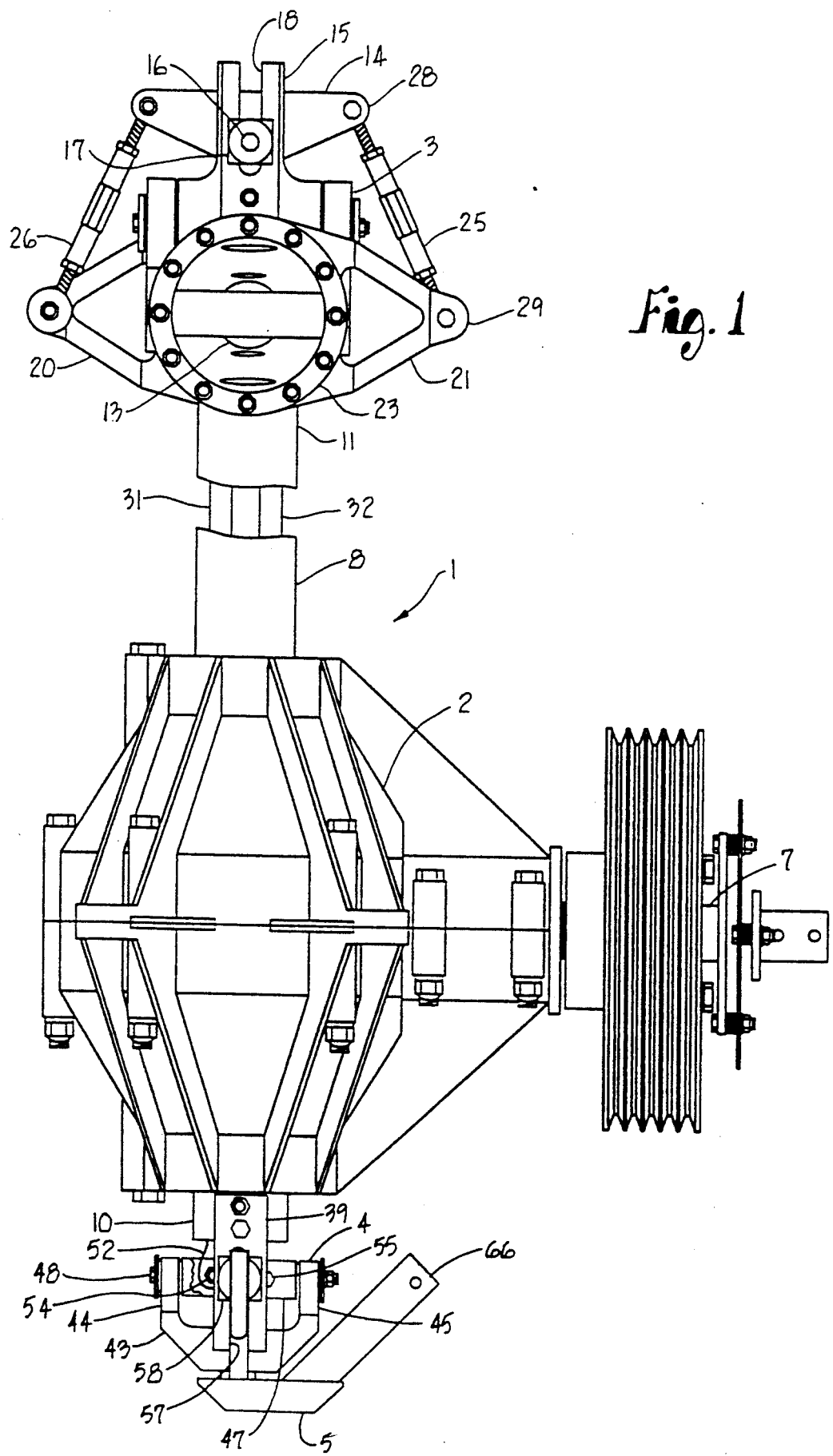
FIG. 1 is a front elevational view of a rotor blade control mechanism embodying the present invention.

A detailed embodiment of the present invention is disclosed herein. However, it is to be understood that the disclosed embodiment is merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

A rotor blade control mechanism 1, FIG. 1, includes a transmission 2, a rotor head 3 and a control 4, with the control 4 connected to a coordinator which is eventually connected to the cyclic and collective control sticks located in the helicopter cockpit. The rotor blade control mechanism 1 is characterized by the absence of a swashplate mechanism.

In more detail, the transmission 2 has a motor input shaft 7 extending from an engine or helicopter motor (not shown) and has internal gearing providing a 90° drive change from the engine input shaft 7 to a drive shaft 8 extending through the transmission 2. The drive shaft 8 is hollow and rotates to cause rotation of the rotor head 3. The drive shaft 8 has a bottom end 10 terminating below the transmission 2 and an upper end 11 to which the rotor head 3 is attached in a conventional manner.

The rotor head 3 is attached to the drive shaft upper end 11 and spins therewith, including rotor blade shafts 13 of variable pitch. The rotor head 3 has an upper yoke 14 connected into an upright fork mechanism 15 by a pin 16 and slide bar 17 movable upwardly and downwardly in a guide channel 18. The yoke 14 moves upwardly and downwardly in the guide channel 18 for collective control and may tilt from side to side, rotating about the hinge pin 16 for cyclic control. Both up and down movement of the yoke 14 in the guide channel 18 and side to side swinging movement about the pin 16 are caused by push-pull movement of control rods (hereinafter described) extending from the control 4.

The rotor head 3 has control arms, such as arms 20 and 21, connected to rings 23, in turn connected to the rotor blade shafts 13 to cause collective and cyclic changes in the angle of attack of rotor blades (not shown) extending from the rotor blade shafts 13. Links 25 and 26 extend from ends 28 of the yoke 14 to ends 29 of the control arms 20 and 21. Preferably, the links 25 and 26 are the adjustable screw and turnbuckle type as illustrated for adjustment of the proper pitch angle of the blades.

Figure 2:
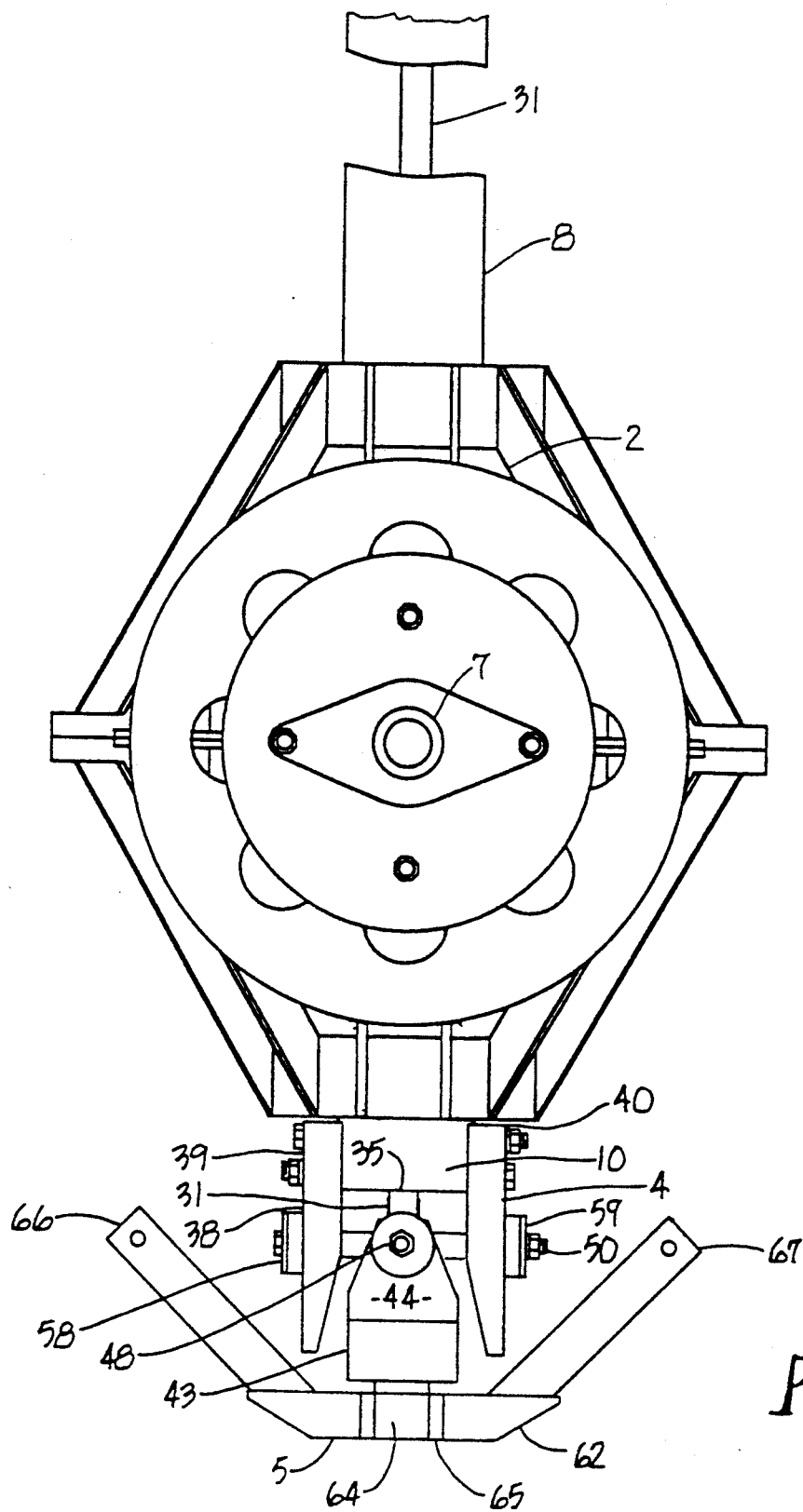
FIG. 2 is a fragmentary, side elevational view rotated 90 degrees from FIG. 1.

The control means 4 regulates the rotor head control arms 20 and 21 and links 25 and 26. The control means includes at least a pair of rods 31 and 32, extending through the hollow drive shaft 8, with upper ends operably connected to the rotor head control arm and links and lower ends 35, FIG. 2, terminating substantially at the drive shaft bottom end 10.

The control 4 includes a fork 38 formed of fingers 39 and 40 connected to the drive shaft bottom end 10 and extending downwardly therefrom in spaced relation. In the illustrated example, the fingers 39 and 40 are bolted to the shaft bottom end 10, although it is foreseen that they may be integral therewith. A yoke 43 is positioned in opposed relation to the fork 38 and has spaced arms 44 and 45 oriented 90° from the fork fingers 39 and 40. A mounting block 47, FIG. 1, extends between the yoke arms 44 and 45 and is connected thereto by a through bolt 48. A center hole in the mounting block 47 is used to connect a through bolt 50, FIG. 2, so that the yoke 43 swings perpendicular to the long axis of the bolt 50.

The control rods 31 and 32 have at their lower ends 35 bearing eyes 52 which are respectively connected to the mounting block 47 by bolts 54 and 55, FIG. 1, extending through bores 56 on opposite sides of the center bolt 48. Therefore, when the yoke 43 swings about the center bolt 48, the bearing eyes 52 of the respective rods 31 and 32 pivot about their respective bolt axles 54 and 55 to cause one rod 31 to push upwardly and the other rod to pull downwardly. This variable push-pull effect, with the rods 31 and 32 connected at their upper ends to a similar arrangement spaced from the center axis of rotation about the pin 16 at the control head yoke 14, causes the yoke 14 to rotate about the pin 16 and lift one control arm 20 up and push the other control arm 21 downwardly, thereby providing a differential control of the rotor blade shafts 13 and cyclic variation.

To provide collective variation and control, the yoke 43 moves upwardly and downwardly with respect to the fork mechanism 38. In the illustrated example, the fork fingers 39 and 40 have longitudinal guide channels 57 therein and the through bolt 50 is connected to the fork 38 through slide blocks 58 and 59 which provide a bearing surface for sliding easily in the guide channels 57. Accordingly, the yoke 43 can move upwardly and downwardly with respect to the fork 38, pushing both rods 31 and 32 up simultaneously in the case of upward movement of the yoke 43 and pulling both rods 31 and 32 down simultaneously in the case of downward movement of the yoke 43. Note that the yoke 43, when tilted about the bolt axis 48 provides for cyclic variation and when moved up and down in the guide channels 57 provides for collective variation of the rotor blade shafts 13. Both collective and cyclic movement is accomplished by simultaneous tilting of the yoke 43 about the bolt axis 48 and moving the yoke 43 up and down in the guide channels 57.

The coordinator 5 is attached to the control 4 and is spinnably connected to the yoke 43; that is, the yoke 43 spins relative to the coordinator 5. The coordinator 5 is connected to the fuselage of the helicopter by a control arm arrangement (not shown) which permits both upward and downward movement of the coordinator 5 and sidewards swinging movement of the coordinator 5. The coordinator 5 includes a central body 62 connected to the control 4 so that it spins relative thereto. The coordinator 5 is non-spinnably connected to the fuselage of the aircraft, as in conventional control mechanisms and because the control 4 spins with the rotation of the drive shaft 8, the coordinator 5 must be held stable with respect to the aircraft to which it is connected. Accordingly, the central body 62 has a central axle 64 within a bearing 65, FIG. 2, which secures the central body 62 to the yoke 43. Preferably, the axle pin 64 is aligned with the rotational axis of the drive shaft 8 when in the position shown in FIGS. 1 and 2, and is also aligned with the crossing of the axes of the axle bolts 48 and 50 for smooth, wobble-free relation when the drive shaft 8 is rotating.

Coordinator arms 66 and 67 extend upwardly and angularly from the central body 62 for eventual connection to the aircraft cockpit control mechanism. It will be appreciated that the aircraft cockpit control mechanism will include linkages or arms which move the arms 66 and 67 upwardly simultaneously for collective control or move the arms 66 and 67 differentially for cyclic control and also provide both simultaneous up and down movement and side to side movement.

In summary of the operation of the rotor blade control mechanism 1, all control elements from the control 4 to the rotor head 3 are enclosed within the hollow, rotating drive shaft 8, which reduces mass and obviates the conventional necessity for exposed rotating arms which provide both noise and a source of danger to persons. The control 4 mounted on the bottom end 10 of the drive shaft 8 provides easy access of cockpit collective and cyclic controls to the coordinator 5, mounted on the bottom of the control 4. The control 4 moves both upwardly and side to side for unitary and differential collective and cyclic control.

It is to be understood that while certain forms of the present invention have been illustrated and described herein, it is not to be limited to this specific form or arrangement of parts described and shown, except insofar as set forth in the following claims.

I claim:

1. A motor blade control mechanism comprising:
   a) transmission means for receiving an input shaft from an engine and having an elongate, rotating, hollow drive shaft extending therethrough with a bottom end terminating below said transmission means and an upper end terminating above said transmission means;

b) rotor head means attached to said drive shaft upper end and spinning therewith, said rotor head means includes rotor blade shafts of variable pitch and having control arm and link means for cyclic and collective variation of said rotor blade shafts;

c) a control means for regulating said rotor head means control arm and link means, said control means including at least a pair of rods extending through said hollow drive shaft with upper ends operably connected to said rotor head means control arm and link means and lower ends terminating substantially at said drive shaft bottom end, fork means including spaced fingers at said drive shaft bottom end, and a yoke having spaced arms positioned in opposed relation to said fork means, said yoke having a mounting block extending between said arms with said control rods, lower ends swingably connected to said mounting block and a swing pin extending perpendicular to said yoke, through said mounting block and retained in said fork means spaced fingers by a connection means, said control means spinning with said drive shaft at said bottom end and swinging perpendicular to the axis of rotation of said drive shaft, imparting a mutually variable push-pull effect to said control rods for cyclic variation of said rotor blade shafts;

d) said yoke and fork means connection means including guide channels in said spaced fingers and slide blocks mounted in said guide channels to which said swing pin is connected for up and down sliding movement of said yoke, imparting a unitary push-pull effect to said control rods for collective variation of said rotor blade shafts; and e) coordinator means including a central body spinnably connected to said yoke by a pin and bearing means coaxially positioned with respect to said drive shaft and having coordinator arms extending outwardly thereof, said coordinator means swingable sidewardly with said yoke and movable up and down with said yoke for cyclic and collective variation.

* * * * *